United States Patent
Liu et al.

(10) Patent No.: US 9,090,808 B1
(45) Date of Patent: Jul. 28, 2015

(54) ABRASIVE MATERIALS FOR USE IN ABRASIVE-JET SYSTEMS AND ASSOCIATED MATERIALS, APPARATUSES, SYSTEMS, AND METHODS

(71) Applicant: OMAX Corporation, Kent, WA (US)

(72) Inventors: Peter H.-T. Liu, Bellevue, WA (US); Kevin A. Hay, Des Moines, WA (US)

(73) Assignee: OMAX Corporation, Kent, WA (US)

( * ) Notice: Subject to any disclaimer, the term of this patent is extended or adjusted under 35 U.S.C. 154(b) by 0 days.

(21) Appl. No.: 14/209,949

(22) Filed: Mar. 13, 2014

Related U.S. Application Data (60) Provisional application No. 61/801,823, filed on Mar. 15, 2013.

(51) Int. Cl.
*C09K 3/14* (2006.01)
*B24C 1/04* (2006.01)

(52) U.S. Cl.
CPC ............... *C09K 3/1436* (2013.01); *B24C 1/045* (2013.01)

(58) Field of Classification Search
CPC .................................... C09K 3/14; B24C 5/02
USPC .................................................... 51/307, 309
See application file for complete search history.

(56) References Cited

U.S. PATENT DOCUMENTS

| | | | |
|---|---|---|---|
| 5,192,532 A * | 3/1993 | Guay et al. ....................... | 424/53 |
| 5,352,254 A | 10/1994 | Celikkaya | |
| 6,227,768 B1 | 5/2001 | Higuchi et al. | |
| 7,465,215 B2 | 12/2008 | Shimizu et al. | |
| 2003/0044380 A1 * | 3/2003 | Zhu et al. ................... | 424/78.37 |
| 2006/0219825 A1 | 10/2006 | Rohring et al. | |
| 2007/0154561 A1 * | 7/2007 | Takeda et al. ................. | 424/489 |
| 2009/0214628 A1 * | 8/2009 | de Rijk .......................... | 424/450 |
| 2012/0021676 A1 | 1/2012 | Schubert et al. | |
| 2012/0156969 A1 | 6/2012 | Liu | |

OTHER PUBLICATIONS

U.S. Appl. No. 14/210,017, filed Mar. 13, 2014, Liu et al.
U.S. Appl. No. 13/038,779, filed Mar. 2, 2011, Liu.
Tsai, Feng-Che et al., "Abrasive jet polishing of micro groove using compound SiC abrasives with compound additives," Advanced Materials Research vols. 481-420 (2012), pp. 2153-2157, © 2012 Trans Tech Publications, Switzerland.

* cited by examiner

*Primary Examiner* — Pegah Parvini
(74) *Attorney, Agent, or Firm* — Perkins Coie LLP (57) ABSTRACT

Abrasive materials for use in abrasive jet systems and associated materials, apparatuses, systems, and methods are disclosed. An abrasive material configured in accordance with a particular embodiment includes abrasive particles individually including an abrasive core and a fluid-repelling coating. The individual abrasive cores can be monolithic and have outer surfaces. The individual fluid-repelling coatings can include an amide wax and/or other suitable materials and can extend around at least about 95% of the outer surfaces of the corresponding abrasive cores. An average sieve diameter of the abrasive particles can be from about 5 microns to about 35 microns. A method for making abrasive materials in accordance with a particular embodiment includes introducing abrasive cores into a mixer, introducing particles of a non-liquid fluid-repelling material into the mixer, introducing an anti-clumping material into the mixer, and mixing the abrasive cores, the fluid-repelling material, and the anti-clumping material.

31 Claims, 4 Drawing Sheets

ABRASIVE MATERIALS FOR USE IN ABRASIVE-JET SYSTEMS AND ASSOCIATED MATERIALS, APPARATUSES, SYSTEMS, AND METHODS

CROSS-REFERENCE TO RELATED APPLICATION

This application claims the benefit of U.S. Provisional Application No. 61/801,823, filed Mar. 15, 2013, which is incorporated herein by reference in its entirety.

ACKNOWLEDGEMENT OF GOVERNMENT SUPPORT

This invention was made in part using funds provided by the National Science Foundation Grant Nos. 0944239 and 1058278. The United States Government may have certain rights in this invention.

TECHNICAL FIELD

This disclosure relates to abrasive materials for use in abrasive jet systems and associated materials, apparatuses, systems, and methods.

BACKGROUND

Abrasive jet systems are used in precision cutting, shaping, carving, reaming, and other material-processing applications. During operation, abrasive jet systems typically direct a high-speed jet of fluid (e.g., water) toward a workpiece to rapidly erode portions of the workpiece. Abrasive material can be added to the fluid to increase the rate of erosion. When compared to other material-processing systems (e.g., grinding systems, plasma-cutting systems, etc.), abrasive jet systems can have significant advantages. For example, abrasive jet systems often produce relatively fine and clean cuts, typically without heat-affected zones around the cuts. Abrasive-jet systems also tend to be highly versatile with respect to the material type of the workpiece. The range of materials that can be processed using abrasive jet systems includes very soft materials (e.g., rubber, foam, leather, and paper) as well as very hard materials (e.g., stone, ceramic, and hardened metal). Furthermore, in many cases, abrasive jet systems can execute demanding material-processing operations while generating little or no dust or smoke.

In a typical abrasive-jet system, a pump pressurizes a fluid to a high pressure (e.g., 275 meganewtons/square meter (40,000 pounds/square inch) to 689 meganewtons/square meter (100,000 pounds/square inch) or more). Some of this pressurized fluid is routed through a cutting head that includes an orifice element having an orifice. Passing through the orifice converts static pressure of the fluid into kinetic energy, which causes the fluid to exit the cutting head as a jet at high speed (e.g., up to 762 meters/second (2,500 feet/second) or more) and impact a workpiece. The orifice element can be a hard jewel (e.g., a synthetic sapphire, ruby, or diamond) held in a suitable mount. In many cases, a jig supports the workpiece. The jig, the cutting head, or both can be movable under computer or robotic control such that complex processing instructions can be executed automatically.

Some conventional abrasive-jet systems mix abrasive material and fluid to form slurry before forming the slurry into a jet. This approach can simplify achieving consistent and reliable incorporation of the abrasive material into the jet, but can also cause excessive wear on internal system components as the slurry is pressurized and then formed into the jet. In an alternative approach, abrasive material is mixed with a fluid after the fluid is formed into a jet (e.g., after the fluid passes through an orifice). In this approach, the Venturi effect associated with the jet can draw the abrasive material into a mixing region along a flow path of the jet. When executed properly, this manner of incorporating abrasive material into a jet can be at least partially self-metering. For example, replenishment of abrasive material in the mixing region can automatically match consumption of abrasive material in the mixing region. The equilibrium between replenishment and consumption, however, can be sensitive to variations in the source of the abrasive material upstream from the mixing region. In at least some cases, conventional abrasive materials and/or conventional apparatuses that convey abrasive materials within abrasive jet systems insufficiently facilitate consistent and reliable delivery of abrasive materials to cutting heads. This can lead to variability in incorporation of the abrasive materials into jets passing through the cutting heads, which, in turn, can cause skip cutting in metals, cracking and chipping in glass, delamination in composites, reduced precision, and/or other undesirable material-processing outcomes.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present technology. For ease of reference, throughout this disclosure identical reference numbers may be used to identify identical or at least generally similar or analogous components or features.

DETAILED DESCRIPTION

Specific details of several embodiments of the present technology are disclosed herein with reference to FIGS. 1-9.

Although the embodiments are disclosed herein primarily or entirely with respect to abrasive jet applications, other applications are within the scope of the present technology. For example, abrasive materials configured in accordance with at least some embodiments of the present technology can be useful in gas-entrained particle blasting applications. Abrasive jet systems described herein can be used with a variety of suitable fluids, such as water, aqueous solutions, hydrocarbons, glycol, and liquid nitrogen, among others. As such, although the term "waterjet" may be used herein for ease of reference, unless the context clearly indicates otherwise, the term refers to a jet formed by any suitable fluid, and is not limited exclusively to water or aqueous solutions. It should be noted that other embodiments in addition to those disclosed herein are within the scope of the present technology. For example, embodiments of the present technology can have different compositions, configurations, components, and/or procedures than those shown or described herein. Moreover, a person of ordinary skill in the art will understand that embodiments of the present technology can have compositions, configurations, components, and/or procedures in addition to those shown or described herein and that these and other embodiments can be without several of the compositions, configurations, components, and/or procedures shown or described herein without deviating from the present technology.

In many applications, the diameter of a fluid jet may be relatively small (e.g., from about 76 microns (0.003 inch) to about 250 microns (0.01 inch)). This can be the case, for example, in abrasive jet systems configured for material-processing operations on a small scale (e.g., micromachining applications, among others). A small-diameter jet typically produces a relatively weak Venturi effect. This can complicate consistent and reliable incorporation of an abrasive material into the jet. Vacuum assistance can be used to at least partially compensate for a relatively weak Venturi effect. Vacuum assistance, however, can be challenging to control. Furthermore, devices that provide vacuum assistance tend to be bulky and can undesirably restrict movement of a cutting head.

When producing small-diameter jets and in other applications, it can be advantageous to use an abrasive material that includes relatively fine abrasive particles. For example, in an abrasive-jet system including a cutting head configured to produce a small-diameter jet, abrasive particles can have an average sieve diameter less than about 40% (e.g., less than about 35%, less than about 30%, or below another suitable threshold percentage) of an inner diameter of an exit tube downstream from a mixing region within the cutting head. Such abrasive particles can reduce or prevent clogging (e.g., due to bridging of abrasive particles within the cutting head). The use of relatively fine abrasive particles can also be necessary or desirable in other applications (e.g., in applications that call for reduced surface roughness around a cut). Unfortunately, the use of relatively fine abrasive particles, alone or in conjunction with a relatively weak Venturi effect associated with a small-diameter jet, can complicate reliable incorporation of an abrasive material into a jet. Many undesirable flow characteristics (e.g., clumping and rat-hole formation, among others) tend to be more pronounced with relatively fine abrasive particles than with relatively coarse abrasive particles. By way of theory, and not to limit the scope of the present disclosure, at least some undesirable flow characteristics of conventional abrasive materials may be related to friction between abrasive particles. This particle-to-particle friction can have proportionally more influence on the behavior of abrasive particles as the size of the abrasive particles decreases. Thus, in abrasive-jet systems having miniature exit tubes and/or abrasive jet systems in which the use of relatively fine abrasive particles is otherwise necessary or desirable, feeding abrasive material consistently and reliably to a cutting head can be technically challenging.

Abrasive materials configured in accordance with at least some embodiments of the present technology can at least partially overcome one or more of the disadvantages and technical challenges discussed above and/or one or more other disadvantages and/or technical challenges associated with conventional abrasive jet technology. For example, abrasive materials configured in accordance with at least some embodiments of the present technology can have one or more enhanced flow characteristics relative to at least some conventional abrasive materials. This can reduce or eliminate the need for vacuum assistance. In a particular example, an abrasive material configured in accordance with an embodiment of the present technology includes individual abrasive particles that have a coated abrasive core and are freely moveable relative to one another (e.g., are not stuck, adhered, or otherwise bonded to one another). The abrasive particles, in at least some cases, can flow (e.g., through an opening in response to gravity) more consistently, more reliably, and/or at a faster rate than otherwise similar uncoated abrasive cores. It is expected that coatings of the abrasive particles may reduce friction between the abrasive particles, which, in turn, may reduce undesirable flow characteristics associated with friction. Other mechanisms by which the coatings of the abrasive particles may enhance one or more flow characteristics of the abrasive particles in addition to or instead of reducing friction between the abrasive particles are also possible. Furthermore, abrasive materials configured in accordance with at least some embodiments of the present technology can have other advantages, such as a reduced tendency to form detrimental abrasive accumulations, as described in greater detail below.

Abrasive materials configured in accordance with at least some embodiments of the present technology include relatively fine abrasive particles, such as abrasive particles having an average sieve diameter of about 50 microns (1969 microinches) or less (e.g., within a range from about 5 microns (197 microinches) to about 50 microns (1969 microinches), within a range from about 5 microns (197 microinches) to about 35 microns (1378 microinches), within a range from about 5 microns (197 microinches) to about 25 microns (984 microinches), or within another suitable range). Abrasive materials configured in accordance with other embodiments of the present technology can include relatively coarse abrasive particles, such as abrasive particles having an average sieve diameter of about 50 microns (1969 microinches) or more (e.g., within a range from about 50 microns (1969 microinches) to about 150 microns (5906 microinches), within a range from about 50 microns (1969 microinches) to about 100 microns (3937 microinches), within a range from about 50 microns (1969 microinches) to about 75 microns (2953 microinches), or within another suitable range). As discussed above, the enhanced flow characteristics associated with abrasive materials configured in accordance with at least some embodiments of the present technology may be of greater benefit with respect to relatively fine abrasive particles than with respect to relatively coarse abrasive particles. Other advantages of abrasive materials configured in accordance with at least some embodiments of the present technology may be of greater benefit with respect to relatively coarse abrasive particles than with relatively fine abrasive particles, or be of about equal benefit with respect to both relatively fine abrasive particles and relatively coarse abrasive particles.

Examples of Abrasive Materials and Related Subject Matter

Figure 1:
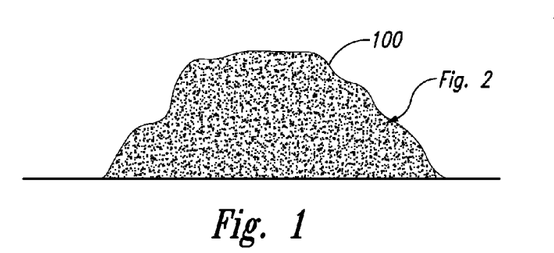
FIG. 1 is a side view illustrating an abrasive material configured in accordance with an embodiment of the present technology.
Figure 2:
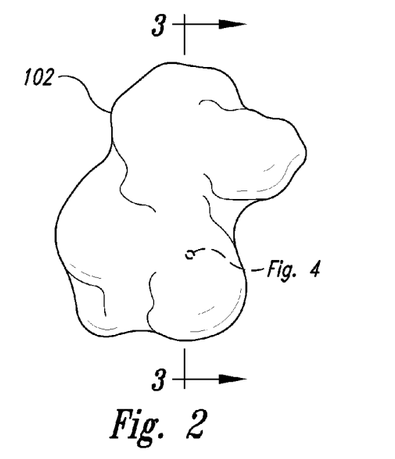
FIG. 2 is an enlarged side view illustrating an abrasive particle of the abrasive material shown in FIG. 1.
Figure 3:
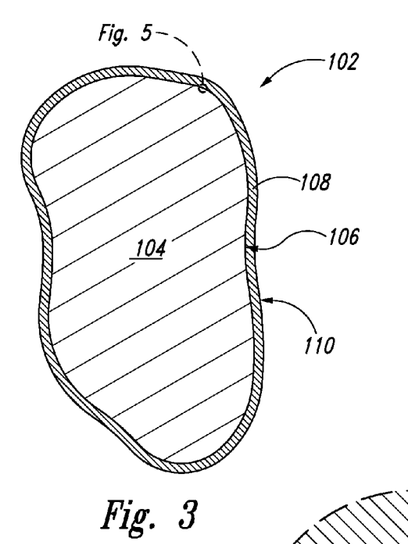
FIG. 3 is a cross-sectional side view taken along the line 3-3 in FIG. 2 illustrating an abrasive core and a coating of the abrasive particle shown in FIG. 2.

FIG. 1 is a side view illustrating an abrasive material 100 configured in accordance with an embodiment of the present technology. FIG. 2 is an enlarged side view illustrating an abrasive particle 102 of the abrasive material 100. FIG. 3 is a cross-sectional side view taken along the line 3-3 in FIG. 2. With reference to FIGS. 1-3 together, the abrasive material 100 can include an agglomeration (e.g., a pile, a quantity within a suitable container (e.g., a sealed container), or another suitable type of agglomeration) of the abrasive particles 102 with the individual abrasive particles 102 being freely moveable relative to one another within the agglomeration. In some embodiments, the abrasive particles 102 can make up at least about 50% of the abrasive material 100 by weight, at least about 75% of the abrasive material 100 by weight, generally all of the abrasive material 100 by weight, all of the abrasive material 100 by weight, or another suitable fraction of the abrasive material 100 by weight or by another suitable metric. A remainder of the abrasive material 100 can include off-specification abrasive particles, a carrier material, a filler material, or another suitable material. The individual abrasive particles 102 can include an abrasive core 104 having a first outer surface 106. At the first outer surface 106, the individual abrasive particles 102 can include a fluid-repelling coating 108 having a second outer surface 110.

Figure 4:
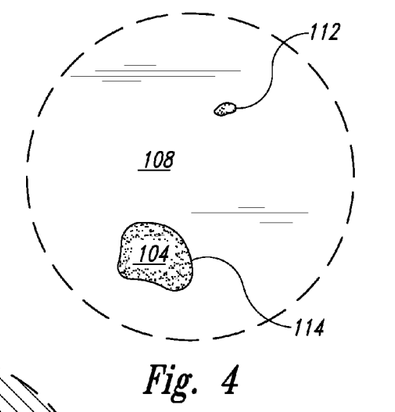
FIG. 4 is a further enlarged side view illustrating a portion of a surface of the abrasive particle shown in FIG. 2.

FIG. 4 is a further enlarged side view illustrating a portion of the second outer surface 110. With reference to FIG. 4, in some embodiments, the coating 108 includes one or more relatively small gaps 112 (e.g., having a width dimension (e.g., diameter) less than about 2 microns (79 microinches), less than about 1 micron, or less than another suitable threshold dimension) and/or one or more relatively large gaps 114 (e.g., having a width dimension (e.g., diameter) greater than about 1 micron, greater than about 2 microns (79 microinches), or greater than another suitable threshold dimension) through which the abrasive core 104 is exposed. In other embodiments, the coating 108 can be at least generally free of the relatively large gaps 114, at least generally free of the relatively small gaps 112, or at least generally free of both the relatively large gaps 114 and the relatively small gaps 112. The coating 108 can extend over some, most, or the entire first outer surface 106. For example, in some embodiments, the coating 108 at least generally surrounds the first outer surface 106. In other embodiments, the coating 108 can extend over a portion of the first outer surface 106 (e.g., a portion greater than about 50%, greater than about 75%, greater than about 95%, greater than about 99%, or greater than another suitable percentage of the first outer surface 106.

Figure 5:
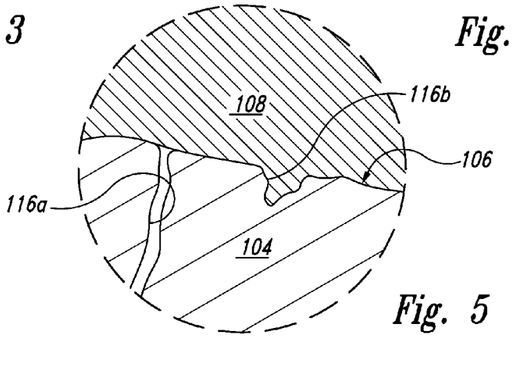
FIG. 5 is an enlarged cross-sectional side view illustrating a portion of an interface between the abrasive core and the coating shown in FIG. 3.

FIG. 5 is an enlarged cross-sectional side view illustrating a portion of an interface between the abrasive core 104 and the coating 108. In some embodiments, the abrasive core 104 can include irregularities 116 (individually identified as irregularities 116a and 116b) at the first outer surface 106. The irregularities 116 can include, for example, pores, indentations, cracks, and/or elevation changes, among other types. In other embodiments, the abrasive core 104 can be at least generally free of some or all such irregularities 116. In some cases, surfaces (e.g., inner surfaces) of the irregularities 116 are excluded from the area of the first outer surface 106. Furthermore, the coating 108 can bridge some or all of the irregularities 116 (e.g., as shown in FIG. 3 with respect to the irregularity 116a), fill some or all of the irregularities 116 (e.g., as shown in FIG. 3 with respect to the irregularity 116b), or partially fill some or all of the irregularities 116. The abrasive core 104 can be monolithic or non-monolithic (e.g., fragmented). For example, the abrasive core 104 can be a single, structurally continuous particle or a group of two or more structurally discontinuous particles clumped together with the coating 108 extending through spaces between the particles or partially or entirely absent from spaces between the particles.

In some embodiments, the abrasive core 104 or a portion thereof is a relatively hard material (e.g., a silicate (e.g., garnet), aluminum oxide, or silicon carbide, among others). For example, the abrasive core 104 or a portion thereof can be a material with a Mohs' hardness from about 6 to about 10, from 7 to about 10, from about 8 to about 10, or within another suitable range. In other embodiments, the abrasive core 104 or a portion thereof can be a softer material. The abrasive core 104 can be water soluble or non-water soluble. In some embodiments, the coating 108 protects a water soluble abrasive core 104 sufficiently to reduce or prevent the abrasive core 104 from dissolving after being incorporated into a jet including water. After the jet impacts a workpiece, the water soluble abrasive core 104 can, in some cases, partially or entirely dissolve (e.g., in a diffusing pool). The use of a water soluble material in the abrasive core 104 can reduce the formation of solid waste, reduce abrasive contamination of a workpiece, reduce the need for maintenance of an abrasive-jet system, and/or have other advantages. Examples of suitable water-soluble materials include ionic compounds (e.g., alkali metal salts) and polar compounds (e.g., saccharide crystals), among others. In some embodiments, the abrasive core 104 or a portion thereof is a biocompatible (e.g. physiologically digestible) material (e.g., a biocompatible crystalline material). In at least some cases, suitable biocompatible materials can also be water soluble. Examples of suitable materials that are both biocompatible and water soluble include sodium chloride, sodium bicarbonate, and sucrose, among others.

The coating 108 or a portion thereof can be a material that enhances the flow characteristics of the abrasive particles 102. In some embodiments, the coating 108 or a portion thereof is a material that tends to repel a fluid used to form a jet in an abrasive jet system. For example, the coating 108 can be made at least partially from a hydrophobic material that tends to repel water within a fluid used to form a jet in an abrasive jet system. Furthermore, the coating 108 or a portion thereof can be a material that is malleable at room temperature. In some embodiments, for example, the coating 108 or a portion thereof is a wax, such as an amide wax and/or synthetic paraffin. In a particular embodiment, the coating 108 or a portion thereof is ethylene bis (stearamide). Similar to the abrasive core 104, the coating 108 or a portion thereof can be a biocompatible (e.g. physiologically digestible) material (e.g., paraffin wax or another suitable edible wax). Using a biocompatible (e.g. physiologically digestible) material in the abrasive core 104 and/or in the coating 108 can facilitate the use of abrasive jet systems with workpieces that are intended to be ingested, implanted, inserted, or otherwise introduced internally into a human, such as foods and medical devices, among others.

Figure 6:
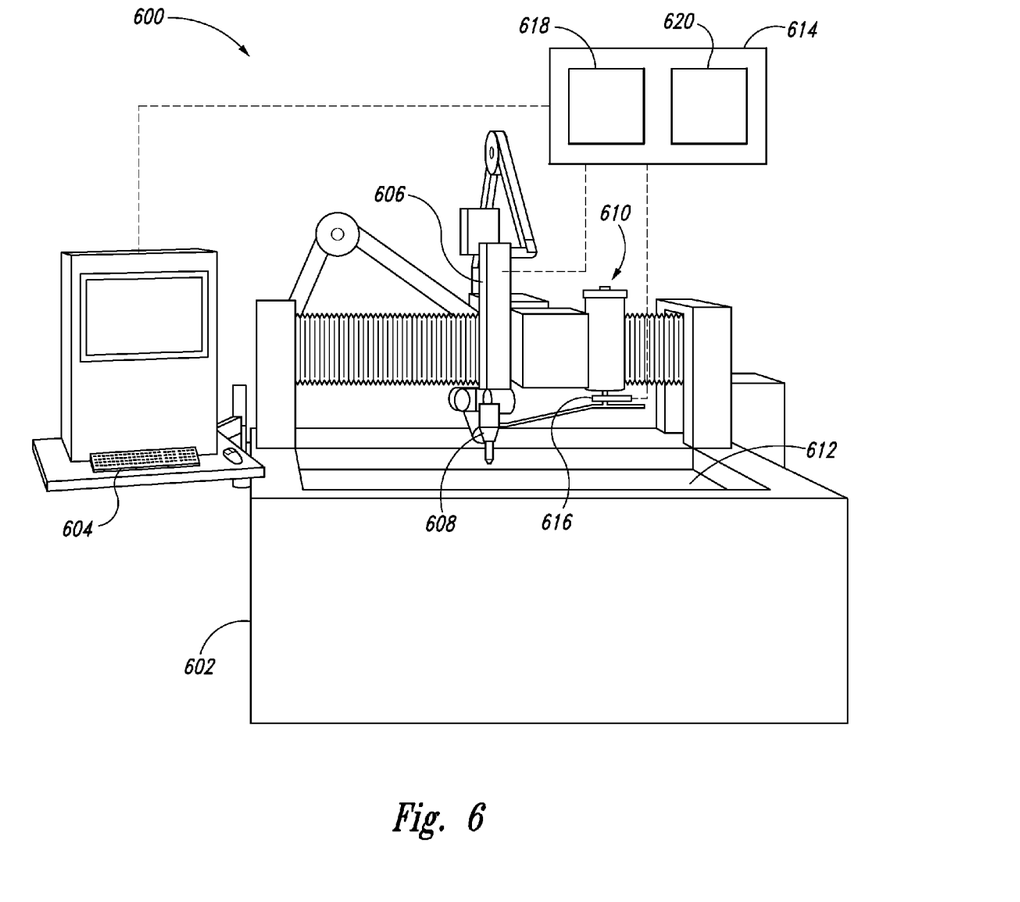
FIG. 6 is a perspective view illustrating an abrasive jet system configured to form a jet including the abrasive material shown in FIG. 1 configured in accordance with an embodiment of the present technology.

FIG. 6 is a perspective view illustrating an abrasive jet system 600 configured to form a jet including the abrasive material 100. The system 600 can include a base 602, a user interface 604 supported by the base 602, and an actuator assembly 606 configured to move both a cutting head 608 and an abrasive feeding apparatus 610 relative to the base 602. For simplicity, FIG. 6 does not show a number of components (e.g., a fluid source, a pump, an intensifier, etc.) that can be included in the system 600 upstream from the cutting head 608. The abrasive feeding apparatus 610 can be configured to feed the abrasive material 100 to the cutting head 608 (e.g., partially or entirely in response to a Venturi effect associated with fluid passing through the cutting head 608). Within the cutting head 608, the abrasive material 100 can accelerate with the jet before being directed toward a workpiece (not shown) held in a jig (also not shown). The base 602 can include a diffusing tray 612 configured to diffuse energy of the jet after it passes through the workpiece. The system 600 can also include a controller 614 (shown schematically) operably connected to the user interface 604, the actuator assembly 606, and the abrasive feeding apparatus 610 (e.g., at a shutoff valve 616 of the abrasive feeding apparatus 610). The controller 614 can include a processor 618 and memory 620 and can be programmed with instructions (e.g., non-transitory instructions contained on a computer-readable medium) that, when executed, control operation of the system 600. Additional details regarding components of the abrasive feeding apparatus 610 are included in U.S. Provisional Patent Application No. 61/801,571, filed Mar. 15, 2013, which is incorporated herein by reference in its entirety.

Figure 7:
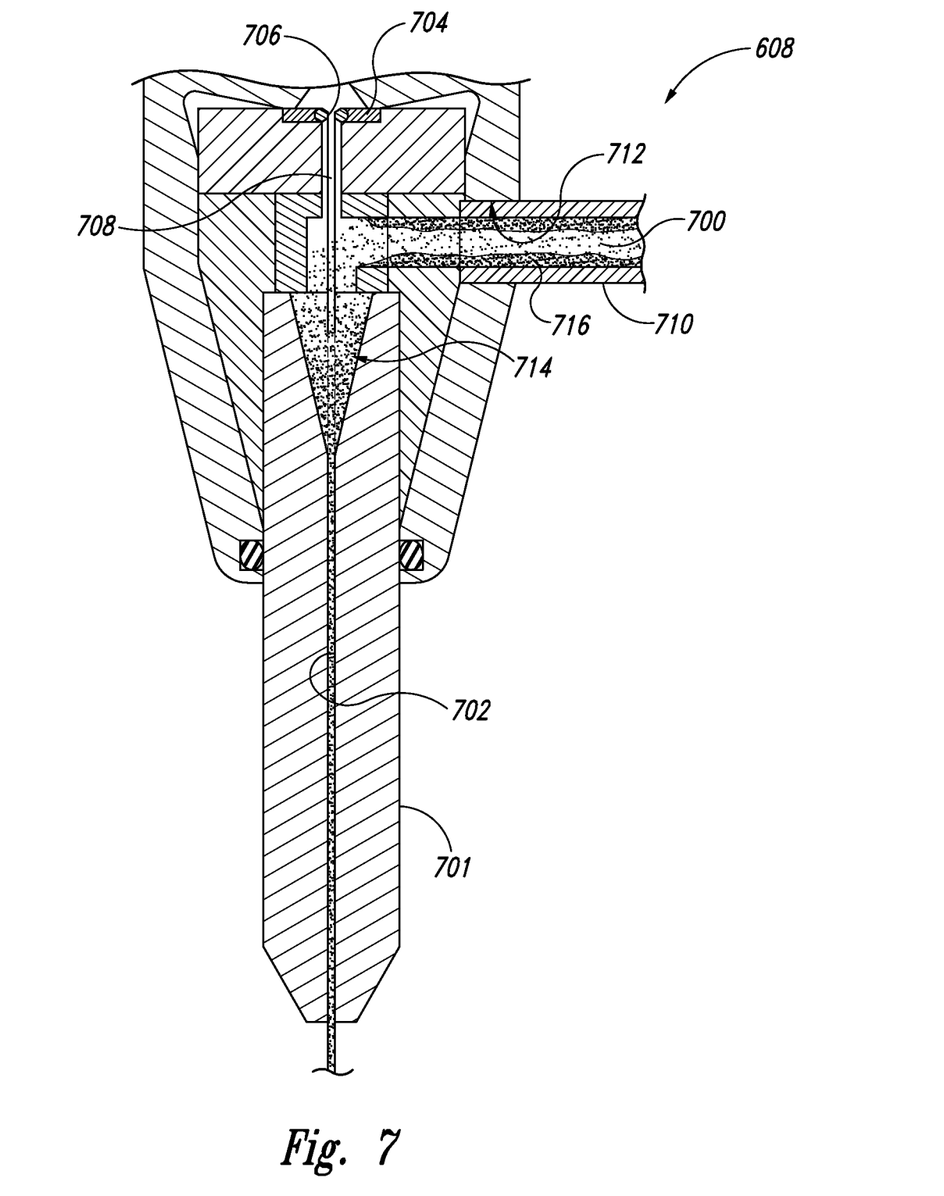
FIG. 7 is a cross-sectional side view of a portion of a cutting head of the abrasive jet system shown in FIG. 6 with a conventional abrasive material flowing into and through the cutting head.

FIG. 7 is a cross-sectional side view of a portion of the cutting head 608 with a conventional abrasive material 700 flowing into and through the cutting head 608. The cutting head 608 can include an exit tube 701 having an axial passage 702. The cutting head 608 also can include an orifice element 704 having an orifice 706. In operation, pressurized fluid can pass through the orifice 706 to form a jet 708. The cutting head 608 can include an abrasive supply conduit 710 attached to an abrasive inlet port 712. The abrasive supply conduit 710 can convey the abrasive material 700 to a mixing region 714 within the cutting head 608 between the orifice element 704 and the exit tube 701. In some embodiments, the mixing region 714 is within a chamber (e.g., a cavity) tapered inwardly from the orifice element 704 toward the exit tube 701. In other embodiments, the mixing region 714 can have another suitable location and/or form. The abrasive material 700 entering the cutting head 608 from the abrasive supply conduit 710 via the abrasive inlet port 712 can be mixed with the jet 708 in the mixing region 714 and carried with and accelerated by the jet 708 through the exit tube 701 before being expelled from the cutting head 608.

In some embodiments, the ability of the abrasive supply conduit 710 to convey the abrasive material 700 to the cutting head 608 may diminish over time due to the buildup of abrasive accumulation 716 (e.g., in the vicinity of the abrasive inlet port 712). This phenomenon can occur whether the abrasive material 700 is fine or coarse. By way of theory and not to limit the scope of the present disclosure, back splashing of fluid from the jet 708 may cause or at least contribute to the detrimental buildup of the abrasive accumulation 716. Back splashing of fluid can occur, for example, when the jet 708 is first initiated and the speed of the jet 708 is ramping up toward a steady-state speed. The jet 708 at this time may briefly have insufficient force to carry the abrasive material 700 through the exit tube 701. In some cases, when the jet 708 is off, some fluid may be present (e.g., due to capillary action) within the axial passage 702. This fluid can wet the abrasive material 700 within the mixing region 714. When the jet 708 is turned on, the jet 708 may impact an upper surface of the wet abrasive material 700 within the mixing region 714 causing a splash that includes both fluid and the abrasive material 700. A portion of the splash may pass the abrasive inlet port 712 and land on and eventually adhere to an interior surface of the abrasive supply conduit 710, thereby contributing to forming the abrasive accumulation 716. Back splashing may occur more frequently when the exit tube 701 is relatively small (e.g., has an inside diameter within a range from about 0.0076 centimeter (0.003 inch) to about 0.025 centimeter (0.01 inch)) than when the exit tube 701 is relatively large (e.g., has an inside diameter within a range from about 0.025 centimeter (0.01 inch) to about 0.25 centimeter (0.1 inch)). In addition or alternatively, back splashing may occur more frequently when the speed of the jet 708 ramps up relatively slowly (e.g., during piercing operations) than when the speed of the jet 708 ramps up relatively quickly.

During back splashing, fluid from the jet 708 also may wet the abrasive material 700 outside the mixing region 714 (e.g., within the abrasive supply conduit 710 in the vicinity of the abrasive inlet port 712). The resulting wet abrasive material 700 may tend to adhere to surfaces (e.g., an inside surface of the abrasive supply conduit 710), thereby also contributing to forming the abrasive accumulation 716. For example, the fluid may have a tendency to bridge spaces between individual abrasive particles 102 within the abrasive material 700 and/or between the abrasive material 700 and surfaces (e.g., the inner surface of the abrasive supply conduit 710) at or near the abrasive inlet port 712. As the fluid evaporates or otherwise exits these spaces, static friction between the individual abrasive particles 102 within the abrasive material 700 and/or between the abrasive material 700 and the surfaces may increase causing the abrasive accumulation 716 to form. Over time, the abrasive accumulation 716 may interfere with flow of the abrasive material 700 through the abrasive supply conduit 710, which can cause, for example, variations in the feed rate of the abrasive material 700 and/or a decrease in the consistency and/or quality of the jet 708. Over the course of many cycles of wetting and drying the abrasive material 700, flow of the abrasive material 700 through the abrasive supply conduit 710 may diminish gradually until eventually the abrasive accumulation 716 may build up to the point that the abrasive supply conduit 710 becomes clogged. When this occurs, or, in some cases, well before this occurs, the abrasive supply conduit 710 is often flushed with water and/or detached from the cutting head 608 and cleaned to remove the abrasive accumulation 716. These maintenance procedures can be costly, inconvenient, interruptive, and/or time-consuming.

Abrasive material configured in accordance with at least some embodiments of the present technology can reduce or prevent formation of the abrasive accumulation 716. For example, when back splashing occurs, the coating 108 of the abrasive material 100 can tend to repel the splashed fluid, thereby preventing or reducing binding or friction between individual abrasive particles 102 within the abrasive material 100. The coating 108 can also reduce or prevent binding between the abrasive material 100 and surfaces (e.g., the inner surface of the abrasive supply conduit 710) at or near the abrasive inlet port 712. In some embodiments, some or all of the surfaces also have a tendency to repel the fluid, which also can reduce or prevent the tendency of the fluid to bind the abrasive material 100 to the surfaces. For example, the coating 108 can be hydrophobic, the surfaces can be coated with a hydrophobic coating (not shown), and the fluid can include water. Additional details regarding hydrophobic coatings on the surfaces are included in U.S. patent application Ser. No. 13/038,779, published as U.S. Patent Application Publication No. US2012/0156969, which is incorporated herein by reference in its entirety. While still wet and/or after partially or completely drying (e.g., by evaporation at ambient conditions) the individual abrasive particles 102 can tend to be freely moveable relative to one another and relative to adjacent surfaces. In this way, the abrasive material 100 can reduce or prevent the need for maintenance procedures directed to removing the abrasive accumulation 716.

Figure 8:
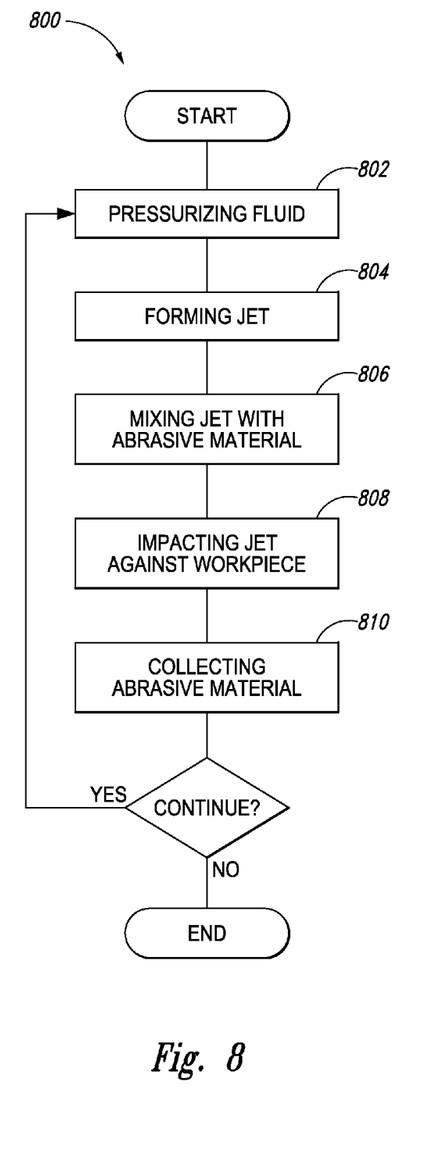
FIG. 8 is a flow chart illustrating a method for using the abrasive material shown in FIG. 1 within an abrasive jet system in accordance with an embodiment of the present technology.

FIG. 8 is a flow chart illustrating a method 800 for using the abrasive material 100 within an abrasive-jet system, such as the abrasive-jet system 600 in accordance with an embodiment of the present technology. With reference to FIGS. 1-3 and 6-8 together, the method 800 can include pressurizing fluid upstream from the cutting head 608 (block 802) and then passing the fluid through the orifice 706 to form the jet 708 (block 804). After forming the jet 708 (block 804), the method 800 can include mixing the jet 708 with the abrasive material 100 downstream from the orifice 706 (block 806). Next, the method 800 can include impacting the jet 708 against a workpiece (block 808). In some embodiments, the workpiece is configured to be ingested, implanted, inserted, or otherwise introduced internally into a human. In these and other embodiments, the abrasive cores 104 of the abrasive material 100 or a portion thereof can be a biocompatible (e.g. physiologically digestible) material (e.g., a biocompatible crystalline material). Similarly, the coatings 108 of the abrasive material 100 or a portion thereof can be a biocompatible (e.g. physiologically digestible) material (e.g., a biocompatible crystalline material). After impacting the jet 708 against the workpiece (block 808), the method 800 can include dispersing the jet 708 in a fluid pool (e.g., within the diffusing tray 612) and then collecting the abrasive material 100 (block 810). In some embodiments, the coatings 108 can facilitate collecting the abrasive material 100 (block 810). For example, the coatings 108 or remnants of the coatings 108 still adhered to the abrasive cores 104 after impacting the jet 708 against the workpiece (block 808) can cause at least some of the abrasive particles 102 of the abrasive material 100 to float on the surface of the fluid pool. In some embodiments, before impacting the jet 708 against the workpiece (block 808), the abrasive particles are buoyant in deionized water at room temperature.

Figure 9:
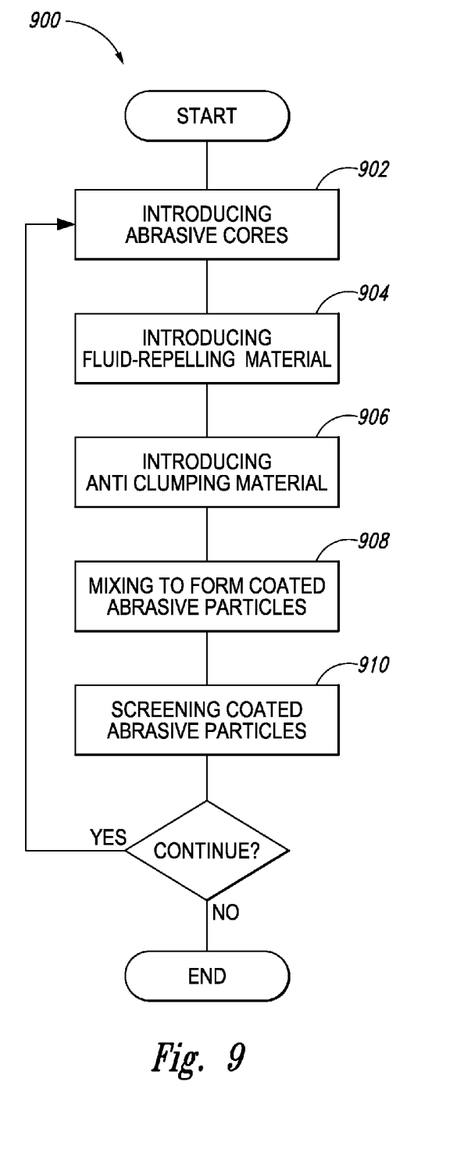
FIG. 9 is a flow chart illustrating a method for making the abrasive material shown in FIG. 1 in accordance with an embodiment of the present technology.

FIG. 9 is a flow chart illustrating a method 900 for making the abrasive material 100 in accordance with an embodiment of the present technology. With reference to FIGS. 1-3 and 9 together, the method 900 can include introducing the abrasive cores 104 into a mixer (block 902). The abrasive cores 104 can have a first average sieve diameter within a range from about 5 microns (197 microinches) to about 50 microns (1969 microinches) or within another suitable range. The method 900 can also include introducing a hydrophobic material (e.g., an amide wax) into the mixer (block 904). The hydrophobic material can be non-liquid at room temperature and softer than the abrasive cores 104. In some embodiments, the hydrophobic material has a Mohs' hardness at room temperature less than about 1 (e.g., within a range from about 0.1 to 1, within a range from about 0.1 to about 0.5, within a range from about 0.15 to about 0.3, or within another suitable range). In other embodiments, the hydrophobic material can have a Mohs' hardness at room temperature greater than about 1. The hydrophobic material can be at least partially in particulate form. For example, particles of the hydrophobic material can have a second average sieve diameter within a range from about 1 micron to about 8 microns (315 microinches) or within another suitable range. In some embodiments, the second average sieve diameter is less than the first average sieve diameter (e.g., within a range from about 1% to about 30% of the first average sieve diameter or within another suitable range).

The method 900 can also include introducing an anti-clumping material into the mixer (block 906). In some embodiments, the anti-clumping material is at least partially in particulate form. For example, the anti-clumping material can include fumed silica particles, such as submicron fumed silica particles. The anti-clumping material can be surface treated (e.g., to enhance hydrophobicity). One example of a suitable anti-clumping material is CAB-O-SIL® TS-530 hexamethyldisilazane treated fumed silica available from Cabot Corporation (Boston, Mass.). After the abrasive cores 104, the hydrophobic material, and the anti-clumping material have been introduced into the mixer, the method 900 can include mixing the abrasive cores 104, the hydrophobic material, and the anti-clumping material within the mixer to form the abrasive particles 102 (block 908). Next, the abrasive particles 102 can be screened (e.g., mechanically screened) (block 910) and a screened portion of the abrasive particles 102 can be collected. In some embodiments, the average sieve diameter of the screened portion is within a range from about 5 microns (197 microinches) to about 50 microns (1969 microinches) (e.g., within a range from about 5 microns (197 microinches) to about 35 microns (1378 microinches)) or within another suitable range.

During mixing, the hydrophobic material can deform in response to impacting the abrasive cores 104. This can cause the hydrophobic material to adhere to (e.g., coalesce around) the abrasive cores 104. In some embodiments, a weight ratio of the abrasive cores 104 to the hydrophobic material during mixing is within a range from about 50:1 to about 600:1 or within another suitable range. The anti-clumping material can reduce or prevent the partially or fully coated abrasive cores 104 from sticking to one another during mixing. It is expected that introducing a relatively small proportion of the anti-clumping material may sufficiently reduce or prevent the partially or fully coated abrasive cores 104 from sticking to one another during mixing without unduly interfering with formation of the coatings 108. In some embodiments, a weight ratio of the abrasive cores 104 to the anti-clumping material during mixing is within a range from about 100:1 to about 1500:1 or within another suitable range. In a particular example, about 99.3 wt % of garnet abrasive cores 104 having an average sieve diameter of about 31 microns (1221 microinches), about 0.5 wt % of ethylene bis (stearamide) micronized wax having an average sieve diameter within a range from about 3 microns (118 microinches) to about 5 microns (197 microinches), and about 0.2 wt % of fumed silica are mixed for about 1 to 2 hours.

The relative concentrations of the hydrophobic material and the anti-clumping material can affect the performance of fine and coarse abrasive particles differently. As such, these concentrations can be selected based on the average size of the abrasive cores 104. For example, when the abrasive cores 104 are very fine (e.g., when the first average sieve diameter of the abrasive cores 104 is less than about 30 microns (1221 microinches), such as from about 5 microns (197 microinches) to about 28 microns (984 microinches)) it can be useful to use a relatively high concentration of the anti-clumping material (e.g., a higher concentration of anti-clumping material than of hydrophobic material). For example, the concentration of anti-clumping material can be greater than about 0.3 wt % (e.g., from about 0.3 wt % to about 1 wt %), greater than about 0.4 wt % (e.g., from about 0.4 wt % to about 1 wt %), greater than another suitable threshold percentage, or within another suitable range. In a particular example, about 99.6 wt % of garnet abrasive cores 104 having an average sieve diameter of about 27 microns (1063 microinches), about 0.2 wt % of ethylene bis (stearamide) micronized wax having an average sieve diameter within a range from about 3 microns (118 microinches) to about 5 microns (197 microinches), and about 0.4 wt % of fumed silica are mixed for about 1 to 2 hours.

Although the method 900 is described above in the context of mixing a solid hydrophobic material and the abrasive cores 104, in other cases, the hydrophobic material can be applied (e.g., sprayed) onto the abrasive cores 104 in liquid form. For example, the abrasive cores 104 can be coated with a liquid hydrophobic material and then allowed to dry before further processing.

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments, the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments can also exhibit such advantages, and not all embodiments need necessarily exhibit such advantages or other advantages disclosed herein to fall within the scope of the present technology. Accordingly, this disclosure and associated technology can encompass other embodiments not expressly shown or described herein.

Certain aspects of the present technology may take the form of computer-executable instructions, including routines executed by a controller or other data processor. In some embodiments, a controller or other data processor is specifically programmed, configured, or constructed to perform one or more of these computer-executable instructions. Furthermore, some aspects of the present technology may take the form of data (e.g., non-transitory data) stored or distributed on computer-readable media, including magnetic or optically readable or removable computer discs as well as media distributed electronically over networks. Accordingly, data structures and transmissions of data particular to aspects of the present technology are encompassed within the scope of the present technology. The present technology also encompasses methods of both programming computer-readable media to perform particular steps and executing the steps.

The methods disclosed herein include and encompass, in addition to methods of making and using the disclosed materials, apparatuses, and systems, methods of instructing others to make and use the disclosed materials, apparatuses, and systems. For example, a method in accordance with a particular embodiment includes introducing abrasive cores into a mixer, introducing a fluid-repelling material into the mixer, introducing an anti-clumping material into the mixer, and mixing the abrasive cores, the fluid-repelling material, and the anti-clumping material within the mixer to form abrasive particles. A method in accordance with another embodiment includes instructing such a method.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

We claim:

1. A method, comprising:
   introducing abrasive cores into a mixer;
   introducing a fluid-repelling material into the mixer, the fluid-repelling material being non-liquid and softer than the abrasive cores;
   introducing an anti-clumping material into the mixer; and
   mixing the abrasive cores, the fluid-repelling material, and the anti-clumping material within the mixer to form abrasive particles, wherein the mixing includes mixing the abrasive cores, the fluid-repelling material, and the anti-clumping material while a weight ratio of the abrasive cores to the fluid-repelling material is within a range from 50:1 to 600:1.

2. The method of claim 1 wherein:
   introducing the abrasive cores includes introducing abrasive cores including a water-soluble material; and
   introducing the fluid-repelling material includes introducing a hydrophobic material.

3. The method of claim 1 wherein introducing the fluid-repelling material includes introducing a fluid-repelling material having a Mohs' hardness at room temperature within a range from 0.1 to 0.5.

4. The method of claim 1 wherein introducing the fluid-repelling material includes introducing an amide wax.

5. The method of claim 1 wherein introducing the anti-clumping material includes introducing fumed silica.

6. The method of claim 1, further comprising mechanically screening the abrasive particles.

7. The method of claim 6, further comprising collecting a screened portion of the abrasive particles, wherein an average sieve diameter of the screened portion is within a range from 5 to 35 microns.

8. The method of claim 1 wherein:
   introducing the fluid-repelling material includes introducing particles of the fluid-repelling material; and
   introducing the anti-clumping material includes introducing particles of the anti-clumping material.

9. The method of claim 1 wherein the mixing includes mixing the abrasive cores, the fluid-repelling material, and the anti-clumping material while a weight ratio of the abrasive cores to the anti-clumping material is within a range from 100:1 to 1500:1.

10. The method of claim 8 wherein:
    introducing the abrasive cores includes introducing abrasive cores having a first average sieve diameter; and
    introducing particles of the fluid-repelling material includes introducing particles of the fluid-repelling material having a second average sieve diameter, the second average sieve diameter being within a range from 1% to 30% of the first average sieve diameter.

11. The method of claim 8 wherein:
introducing the abrasive cores includes introducing abrasive cores having an average sieve diameter within a range from 5 to 50 microns; and
introducing particles of the fluid-repelling material includes introducing particles of the fluid-repelling material having an average sieve diameter within a range from 1 to 8 microns.

12. A method, comprising:
introducing abrasive cores into a mixer;
introducing a fluid-repelling material into the mixer, the fluid-repelling material being non-liquid and softer than the abrasive cores;
introducing an anti-clumping material into the mixer; and
mixing the abrasive cores, the fluid-repelling material, and the anti-clumping material within the mixer to form abrasive particles, wherein the mixing includes mixing the abrasive cores, the fluid-repelling material, and the anti-clumping material while a weight ratio of the abrasive cores to the anti-clumping material is within a range from 100:1 to 1500:1.

13. The method of claim 12 wherein:
introducing the abrasive cores includes introducing abrasive cores including a water-soluble material; and
introducing the fluid-repelling material includes introducing a hydrophobic material.

14. The method of claim 12 wherein introducing the fluid-repelling material includes introducing a fluid-repelling material having a Mohs' hardness at room temperature within a range from 0.1 to 0.5.

15. The method of claim 12 wherein introducing the fluid-repelling material includes introducing an amide wax.

16. The method of claim 12 wherein introducing the anti-clumping material includes introducing fumed silica.

17. The method of claim 12, further comprising mechanically screening the abrasive particles.

18. The method of claim 17, further comprising collecting a screened portion of the abrasive particles, wherein an average sieve diameter of the screened portion is within a range from 5 to 35 microns.

19. A method, comprising:
introducing abrasive cores into a mixer, wherein introducing the abrasive cores includes introducing abrasive cores having a first average sieve diameter;
introducing particles of a fluid-repelling material into the mixer, the fluid-repelling material being non-liquid and softer than the abrasive cores, wherein introducing the particles of the fluid-repelling material includes introducing particles of the fluid-repelling material having a second average sieve diameter, the second average sieve diameter being within a range from 1% to 30% of the first average sieve diameter;
introducing particles of an anti-clumping material into the mixer; and
mixing the abrasive cores, the particles of the fluid-repelling material, and the particles of the anti-clumping material within the mixer to form abrasive particles.

20. The method of claim 19 wherein:
introducing the abrasive cores includes introducing abrasive cores including a water-soluble material; and
introducing the particles of the fluid-repelling material includes introducing particles of a hydrophobic material.

21. The method of claim 19 wherein introducing the particles of the fluid-repelling material includes introducing particles of a fluid-repelling material having a Mohs' hardness at room temperature within a range from 0.1 to 0.5.

22. The method of claim 19 wherein introducing the particles of the fluid-repelling material includes introducing an amide wax.

23. The method of claim 19 wherein introducing the particles of the anti-clumping material includes introducing particles of fumed silica.

24. The method of claim 19, further comprising:
mechanically screening the abrasive particles; and
collecting a screened portion of the abrasive particles, wherein an average sieve diameter of the screened portion is within a range from 5 to 35 microns.

25. A method, comprising:
introducing abrasive cores into a mixer, wherein introducing the abrasive cores includes introducing abrasive cores having an average sieve diameter within a range from 5 to 50 microns; and
introducing particles of a fluid-repelling material into the mixer, the fluid-repelling material being non-liquid and softer than the abrasive cores, wherein introducing the particles of the fluid-repelling material includes introducing particles of the fluid-repelling material having an average sieve diameter within a range from 1 to 8 microns;
introducing particles of an anti-clumping material into the mixer; and
mixing the abrasive cores, the particles of the fluid-repelling material, and the particles of the anti-clumping material within the mixer to form abrasive particles.

26. The method of claim 25 wherein:
introducing the abrasive cores includes introducing abrasive cores including a water-soluble material; and
introducing the particles of the fluid-repelling material includes introducing particles of a hydrophobic material.

27. The method of claim 25 wherein introducing the particles of the fluid-repelling material includes introducing particles of a fluid-repelling material having a Mohs' hardness at room temperature within a range from 0.1 to 0.5.

28. The method of claim 25 wherein introducing the particles of the fluid-repelling material includes introducing an amide wax.

29. The method of claim 25 wherein introducing the particles of the anti-clumping material includes introducing particles of fumed silica.

30. The method of claim 25, further comprising:
mechanically screening the abrasive particles; and
collecting a screened portion of the abrasive particles, wherein an average sieve diameter of the screened portion is within a range from 5 to 35 microns.

31. The method of claim 25 wherein the average sieve diameter of the particles of the fluid-repelling material is within a range from 1% to 30% of the average sieve diameter of the abrasive cores.

* * * * *

UNITED STATES PATENT AND TRADEMARK OFFICE
CERTIFICATE OF CORRECTION

PATENT NO. : 9,090,808 B1  
APPLICATION NO. : 14/209949  
DATED : July 28, 2015  
INVENTOR(S) : Peter H.-T. Liu et al.

It is certified that error appears in the above-identified patent and that said Letters Patent is hereby corrected as shown below:

In the Claims

In column 14, line 22, in claim 25, after "microns;" delete "and".

Signed and Sealed this  
Fifth Day of April, 2016

Michelle K. Lee  
*Director of the United States Patent and Trademark Office*